March 16, 1926. 1,576,565
F. A. WHITTEN
HOOD DOOR CONSTRUCTION FOR MOTOR VEHICLES
Filed July 23, 1921    2 Sheets-Sheet 1
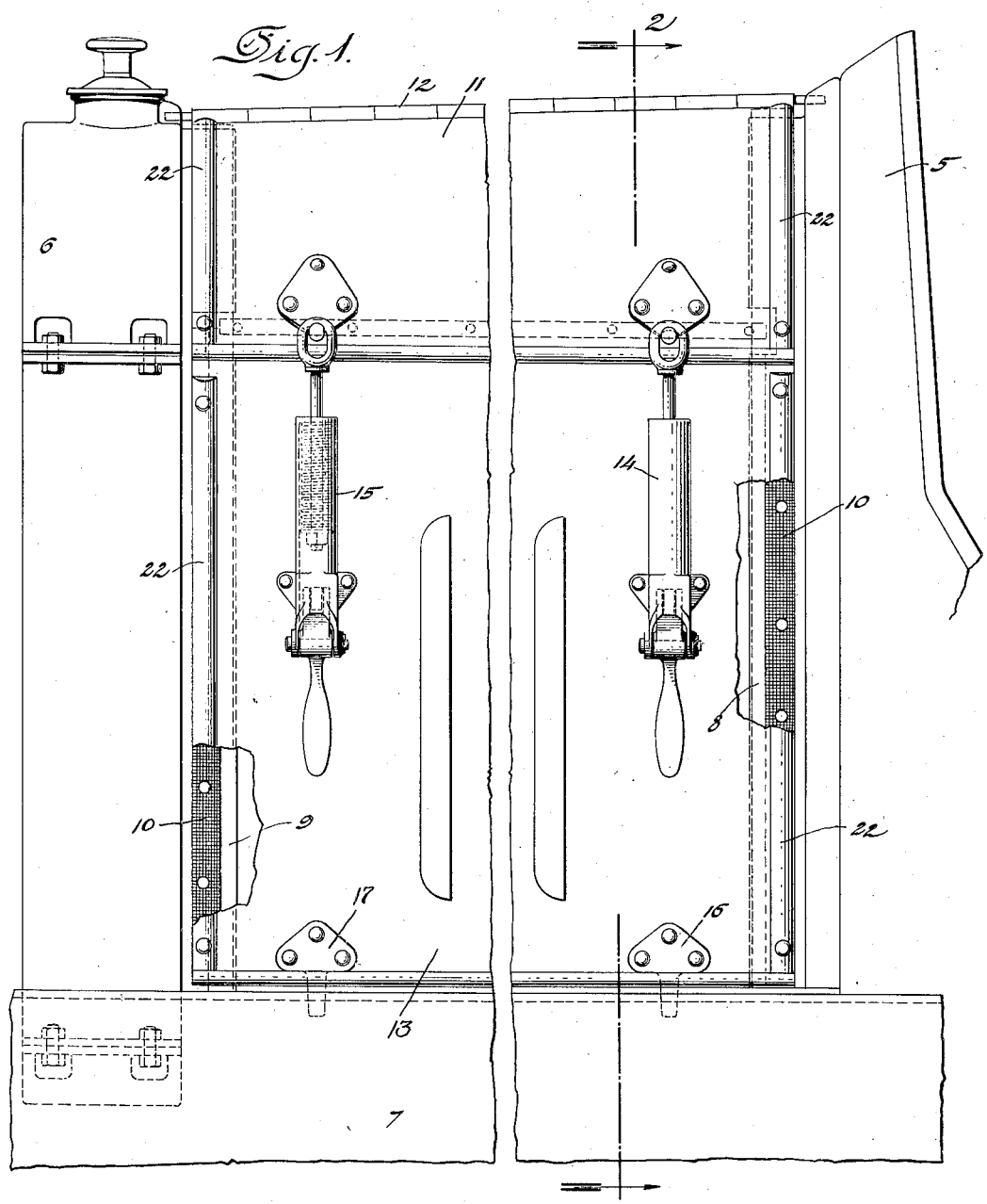
Inventor:
Frank A. Whitten
By his Attorneys:

March 16, 1926.  
F. A. WHITTEN  
1,576,565  
HOOD DOOR CONSTRUCTION FOR MOTOR VEHICLES  
Filed July 23, 1921　　2 Sheets-Sheet 2
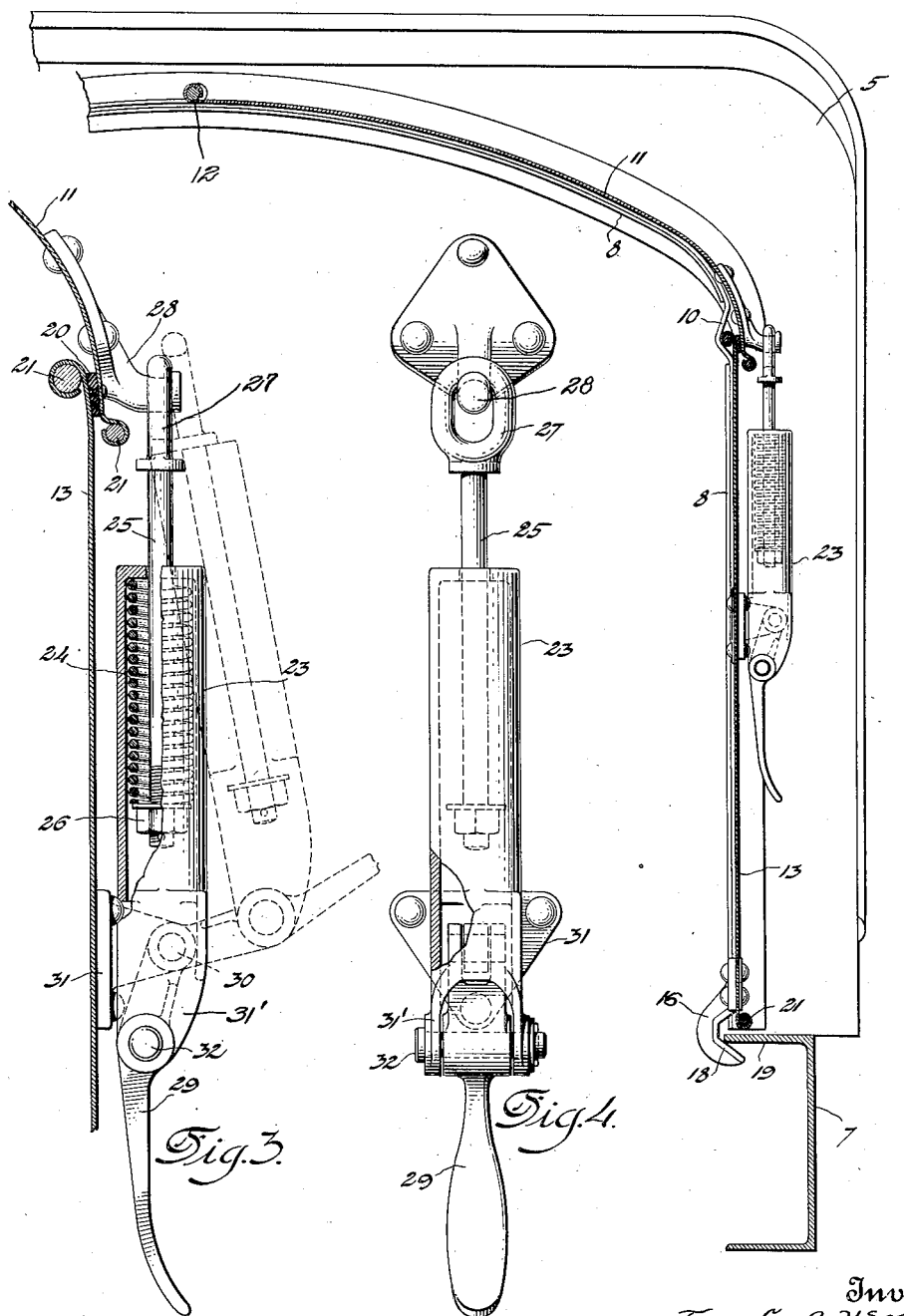

Patented Mar. 16, 1926.

1,576,565

UNITED STATES PATENT OFFICE.

FRANK A. WHITTEN, OF DETROIT, MICHIGAN, ASSIGNOR TO GENERAL MOTORS CORPORATION, OF DETROIT, MICHIGAN, A CORPORATION OF DELAWARE.

HOOD-DOOR CONSTRUCTION FOR MOTOR VEHICLES.

Application filed July 23, 1921. Serial No. 487,206.

*To all whom it may concern:*

Be it known that I, FRANK A. WHITTEN, a citizen of the United States, and a resident of the city of Detroit, county of Wayne, and State of Michigan, have invented certain new and useful Improvements in Hood-Door Construction for Motor Vehicles, of which the following is a full, clear, concise, and exact description, such as will enable others skilled in the art to which the invention relates to make and use the same, reference being made therein to the accompanying drawings, which form a part of this specification.

My invention relates to hood devices or structures used in connection with automobiles, motor driven trucks and similar self-propelled vehicles, to enclose the engine whereby the vehicle is driven and protect the same; and the principal object of my invention is to provide an improved hood structure having doors of such form, construction and arrangement that access may be more readily had to the engine when the doors are opened than has heretofore commonly been the case.

A further object of my invention is to provide an improved hood structure in which the doors which enclose the space occupied by the engine are made in sections which are not permanently connected with one another, as has heretofore commonly been the case; each side of the hood comprising an upper door section hingedly supported relative to the radiator and cowl of the vehicle, together with a lower door section which may be readily removed from the hood structure; the two door sections upon each side of the hood being held together and in their closed condition by yieldable latch or fastening mechanism whereby and through which the lower end of the upper door section and the upper end of the lower door section are separably connected with one another.

A further object of my invention is to provide a hood structure in which the door sections upon each side thereof comprise an upper hinged section and a lower removable section the meeting edges of which are detachably fastened together by yieldable holding means or latches, and in which cam means are provided for forcing the lower end of the removable door section against the usual stops or flanges which provide abutments with which the side edges of the door sections contact when the hood is closed.

A further object of my invention is to provide an improved hood construction in which the side edges of the door sections are yieldably forced against the usual stops or flanges upon the radiator and cowl which support said edges in a more effective manner than has heretofore commonly been the case, and in which rattling of the hood structure as a whole and particularly of the doors thereof will be prevented when the hood is closed and the parts secured together.

With the above and other objects of invention in view my invention consists in the improved hood structure illustrated in the accompanying drawings and hereinafter described and claimed; and in such variations and modifications thereof, within the scope of the concluding claims, as will be obvious to those skilled in the art to which my invention relates.

In the drawings accompanying and forming a part of this specification and wherein the preferred embodiment of my invention is illustrated:

Figure 1 is a view mainly in side elevation, but broken away in parts, showing my improved hood structure in place upon a motor driven truck; the central portion of the structure being omitted to decrease the length of the view.

Figure 2 is a sectional view showing one side of the hood structure shown in Figure 1; the same being taken upon a plane indicated approximately by the line 2—2, Figure 1, looking toward the right.

Figure 3 is a fragmentary view showing the latch mechanism for fastening the lower edge of the upper door section and the upper edge of the lower door section together upon a larger scale and more in detail.

Figure 4 is a view showing one of the yieldable latch members apart from the doors and whereby the doors are held together and in their closed condition.

Referring now to the drawings, the reference numeral 5 designates a cowl structure at the front end of a motor driven vehicle, and 6 designates the radiator thereof; which members may be of any form and construction whatever, so far as the detail features thereof are concerned, as my invention is in no way concerned with the particular structural features of said elements. These members are supported from the frame of the vehicle, one of the side members thereof being indicated by the reference numeral 7; said frame being commonly located adjacent the lower ends of the cowl and radiator structures and extending between the same, as will be appreciated.

The cowl and radiator in accordance with the usual practice in motor vehicle construction are shown as provided with supporting abutments in the form of flanges 8, 9, the purpose of which is to support the side edges of the door sections which form the hood. It will be appreciated, however, that the abutments for the sides of the doors may be unitary parts of the cowl and radiator, or may be formed separately therefrom; my invention not being concerned with the details of the abutments except in so far as abutments of some sort are necessary in order to support the front and rear side edges of the door sections which comprise the hood structure. These stops or abutments are commonly provided with yieldable or non-sonorous cushions against which the side edges of the door rest, as shown at 10, the purpose of which as will be appreciated is to prevent a metal to metal contact between the parts and avoid noise due to slamming of the doors.

The reference numeral 11 designates the upper door section of the near side of the hood structure, the door structure hereinafter described being duplicated upon each side of the hood, as will be appreciated. The upper end of this door section is shown as hingedly connected at 12 relative to the cowl and radiator structures, the upper door sections being preferably permanently assembled with the cowl and radiator altho in some forms of hood structures the hinge connection between the upper door sections and the cowl and radiator is of such a character that they may be readily removed. In my improved hood structure, however, in which the lower door sections are separate from the upper sections, and are readily removable from the hood structure, it will not ordinarily be necessary to hinge the upper sections in such a manner that they also may be readily removed.

The reference numeral 13 designates the lower door section of my improved hood structure, the same being free from the remaining portion of the hood and removable therefrom by merely lifting the same away from the hood structure, after loosening the fastening members whereby said lower section is held in place in the hood structure. This lower removable door section has its side edges resting against the abutments 8, 9 as hereinbefore explained; and the same is movable, slightly, in a vertical direction after it is assembled with the rest of the hood structure, and as the same is secured in place therein; such movement being produced by yieldable fastening members 14, 15 to be hereinafter described having springs which act to draw the lower end of the upper door section and the upper end of the lower door section together and to move the lower door section vertically to a slight extent as the door sections are fastened together in the embodiment of my invention illustrated.

Cam mechanism is provided at the lower end of the removable door section 13 which acts, as slight upward movement is imparted to said lower section, to force the section as a whole and particularly the lower end thereof inward and against the abutments provided by the flanges 8, 9 and cushions 10 carried thereby; said mechanism being shown as comprising two lugs or stops 16, 17 secured to the lower edge of the removable door section and provided each with an inclined portion 18 which hooks under the upper flange 19 of the frame member 7, or which co-operates with an equivalent fixed member extending between the lower ends of the radiator and cowl; it being immaterial whether the stationary member engaged by the lugs and which serves to restrain upward movement of the door section in question is a part of the frame, or is a member separate therefrom.

It therefore follows that the act of fastening the lower end of the upper door section and the upper end of the lower door section together through and by means of the yieldable latch members 14, 15 will produce a slight upward movement of the lower section, with a resulting cam action between the inclined faces 18 and the frame or equivalent member, thus forcing the lower door section and particularly the lower end thereof into firm contact with the abutments 8, 9 whereby the side edges thereof are supported; and that the side edges of the upper and lower door sections will be forced into firm engagement with said abutments throughout their entire extent by the combined action of the yieldable latch members and the cam lugs and yieldably held in that condition, whereby rattling of the door sections will be prevented when the hood is closed. A cushion of fabric or equivalent non-sonorous material is preferably interposed between the lower end of the upper door section and the upper end of the lower door section, as indicated at 20, to thereby prevent a metal to metal contact between said ends; and the upper and lower edges of the door sections are preferably provided with strengthening rods 21 as is usual in such structures. Also, the side edges of the door sections are preferably provided with strengthening strips 22 in order to stiffen the said edges where they overlie the abutments whereby the door sections are supported.

Various forms or types of yieldable holding or latch members may be provided for fastening the lower end of the upper door section and the upper end of the lower door section together as my invention, regarded in its broader aspect, is not limited to any particular construction of latch member. I prefer, however, to use latch members of the form shown in the accompanying drawings and regard the same as forming a part of my invention; said latch members comprising in each case a barrel 23 within which a spring 24 is located. Extending into the barrel from the upper end thereof is a stirrup rod 25 the lower end of which is provided with an abutment 26 between which and the upper end of the barrel the spring 24 acts under compression, while the upper end of said rod is provided with an eye portion 27 adapted to fit over a lug 28 secured to the upper door section adjacent the lower edge thereof. The barrel 23 is connected with and moved vertically by a handle member 29 the upper end of which is pivotally connected at 30 to a bracket 31 secured to the lower door section; the lower end of the barrel being bifurcated to thereby provide arms 31' which lie one upon each side of the handle 29 and are pivotally connected therewith at 32.

Figure 3 shows in dotted lines the position of the latch member after the lower door section has been put in place and when the two door sections are about to be secured together, the eye 27 of the stirrup rod 25 being about to engage the lug 28 of the upper door section. After engaging the eye with the lug the handle 29 is pulled downward and into its full line position, during which the barrel 23 is moved downward and the spring 24 placed under compression; with the result that after the lever 29 has passed its dead center position and assumed the locking position shown in full lines the ends of the door sections will be yieldably held together by the action of the spring 24. This securing of the door sections together as above explained is accompanied by a slight upward movement of the lower door section and by a forcing of the lower end of said lower section into engagement with the abutments at the side edges thereof, such action being due to the cam mechanism located at the lower end of said section and which acts both to force said door section inward and to limit the upward movement thereof; the cam mechanism in question thus performing the double function of forcing the parts into firm engagement with one another and arresting the upward movement of the lower door section with the yieldable holding members whereby the sections are held together tends to produce.

The lugs 28 being located close to the lower edge of the upper hinged door section 11, and projecting outward from the surface thereof, and upon a portion of said door section which is curved downward to merge with the lower removable door section, it follows that the springs 24 of the latch members in addition to drawing the lower section upward and the upper downward tend to flex the lower portion of the upper section and force its lower edge inward and against the upper edge of the lower door section, thus more effectively holding the upper end of the lower door section against the fixed abutments 8 and 9 and maintaining a tight joint between the parts; and the location of the latch members adjacent the upper end of the hood structure provides a construction in which twisting of the frame of the vehicle due to unevenness in the roadway will be compensated for at the joint between the upper and lower door sections and at the place where the maximum or nearly the maximum lateral movement occurs, whereas in hood structures wherein there is a hinge connection between the door sections and the yieldable latches are at the lower end of the lower section sidewise movement of the upper end of the hood due to twisting of the frame acts to force the side edges of the lower sections, particularly, directly against the fixed abutments, with a resulting straining of the hinge joint between the two door sections. Finally, while I have referred to upper door sections hinged so that they may be swung upward after unlatching the lower sections, such upper sections may in fact be made together and form a unitary roof structure for the hood, which may be either fixedly secured in place or removable as a single piece or element after unlatching the lower sections; as the advantages hereinbefore enumerated and following from the use of removable lower door sections held in place as specified will for the most part be secured whatever be the construction of the upper or roof portion of the hood structure regarded in its entirety.

Having thus described and explained my invention, I claim and desire to secure by Letters Patent:

1. In a hood structure of the class described and in combination with a radiator and cowl, and a frame member located adjacent the lower ends and extending between said elements and having a substantially horizontal upper flange; a removable door section extending between said radiator and cowl and the side edges of which lie adjacent said elements; holding members located adjacent the lower end of said door section and which members have portions extending beneath said upper flange to thereby prevent upward movement of said door section; and yieldable means operatively connected with the upper end of said door section and tending to move the same upward.

2. In a hood structure of the class described and in combination with a radiator and cowl having each an abutment, and a frame member located adjacent the lower ends of and extending between said elements; a removable door section the side edges of which engage said abutments; cam mechanism located adjacent the lower end of said door section and adapted to force said lower end against said abutments; and yieldable fastening means located adjacent the upper end of said door section and acting to move the same vertically.

3. In a hood structure of the class described and in combination with a radiator and cowl having each an abutment, and a frame member located adjacent the lower ends of and extending between said elements; a removable door section the side edges of which engage said abutments; cam members carried by said door section and located adjacent the lower end thereof and adapted to co-operate with said frame member to force said lower end against said abutments; and yieldable holding members located adjacent the upper end of said door section and acting to move said section upward and to force the same against said abutments.

4. In a hood structure of the class described and in combination with a radiator and cowl having each an abutment, and a frame member located adjacent the lower ends of and extending between said elements; a removable door section the side edges of which engage said abutments; yieldable fastening means adjacent the upper end of said door section and acting to move the same upward and force the side edges thereof against said abutments; and cam means located adjacent the lower end of said door section and acting to force the same against said abutments.

5. In a hood structure of the class described and in combination with a radiator and cowl having each an abutment, and a frame member located adjacent the lower ends of and extending between said elements; an upper door section hinged relatively to said cowl and radiator and the side edges of which are supported by said abutments; a lower removable door section; yieldable fastening members whereby the lower end of said hinged section and the upper end of said removable section are secured together; and holding means at the lower end of said lower removable door section and acting to hold said lower end in substantially fixed relation with said frame and to force the side edges of said lower end against said abutments.

6. In a hood structure of the class described and in combination with a radiator and cowl having each an abutment, and a frame member located adjacent the lower ends of and extending between said elements; an upper door section hinged relative to said cowl and radiator and the side edges of which are supported by said abutments; a lower removable door section capable of slight upward movement when in place in said hood structure; yieldable fastening members whereby the lower end of said hinged section and the upper end of said removable section are secured together; and cam mechanism at the lower end of said removable section adapted to restrain upward movement thereof and to force the side edges of said lower end against said abutments.

7. In a hood structure of the class described and in combination with a radiator and cowl having each an abutment, and a frame member located adjacent the lower ends of and extending between said elements; an upper door section hinged relative to said cowl and radiator and the side edges of which are supported by said abutments; a lower removable door section capable of slight upward movement when in place in said hood structure; yieldable fastening members whereby the lower end of said hinged section and the upper end of said removable section are secured together; and cam members secured to said lower section and cooperating with said frame member to restrain upward movement of said removable section and to force the side edges thereof against said abutments.

8. In a hood structure of the class described and in combination with a radiator and cowl, and a frame member located adjacent the lower ends of and extending between said elements; two fixed abutments; a removable door section the side edges of which engage said abutments; cam mechanism located adjacent the lower end of said door section and adapted to force said lower end against said abutment; and yieldable fastening means located adjacent the upper end of said door section and acting to move the same vertically.

9. In a hood structure of the class described and in combination with a radiator and cowl, and a frame member located adjacent the lower ends of and extending between said elements; two fixed abutments; a removable door section the side edges of which engage said abutments and which door section is movable slightly upward when assembled in said hood structure; yieldable fastening means adjacent the upper end of said door section and acting to move the same upward and to force the side edges thereof against said abutments; and cam means located adjacent the lower end of said door section and acting to force the same against said abutment.

10. In a hood structure of the class described and in combination with a radiator and cowl, and a frame member located adjacent the lower ends of and extending between said elements; an upper door section hinged relatively to said cowl and radiator; a lower removable door section capable of slight upward movement when in place in said hood structure; abutments against which the side edges of said door sections rest; yieldable fastening members whereby the lower end of said hinged section and the upper end of said removable section are secured together; and cam mechanism at the lower end of said movable section adapted to restrain upward movement thereof and to force the side edges of said lower end against said abutments.

11. In a hood structure of the class described and in combination with a radiator and cowl, and a frame member located adjacent the lower ends and extending between said elements and having a substantially horizontal upper flange; a removable door section extending between said radiator and cowl and the side edges of which lie adjacent said elements; holding members located adjacent the lower end of said door section and which members have portions extending beneath said upper flange to thereby prevent upward movement of said door section; two fixed abutments located adjacent the upper edge of said door; and two yieldable members carried by said door and engaging said abutments, and tending to move said door upward.

12. In a hood structure of the class described and in combination with a radiator and cowl, a removable door section capable of slight upward movement when assembled in the hood structure, and which section extends between said radiator and cowl; a stationary frame member channel shaped in cross section and having a substantially flat upper portion extending between said radiator and cowl and along the lower edge of said removable door section; hook shaped holding members carried by said removable door section and arranged adjacent the lower edge thereof, and which members engage beneath said flange to prevent upward movement of said door section; an upper door section extending between said radiator and cowl and the lower end of which lies adjacent the upper end of said removable door section; and yieldable fastening means whereby the upper end of said removable door section and the lower end of said upper section are fastened together, and which fastening means tends to move said removable door section upward in fastening the parts together as aforesaid.

In testimony whereof I affix my signature.

FRANK A. WHITTEN.